Sept. 26, 1944.  D. D. STREID  2,358,835
PRESSURE CABIN CONTROL ARRANGEMENT
Filed Oct. 26, 1940
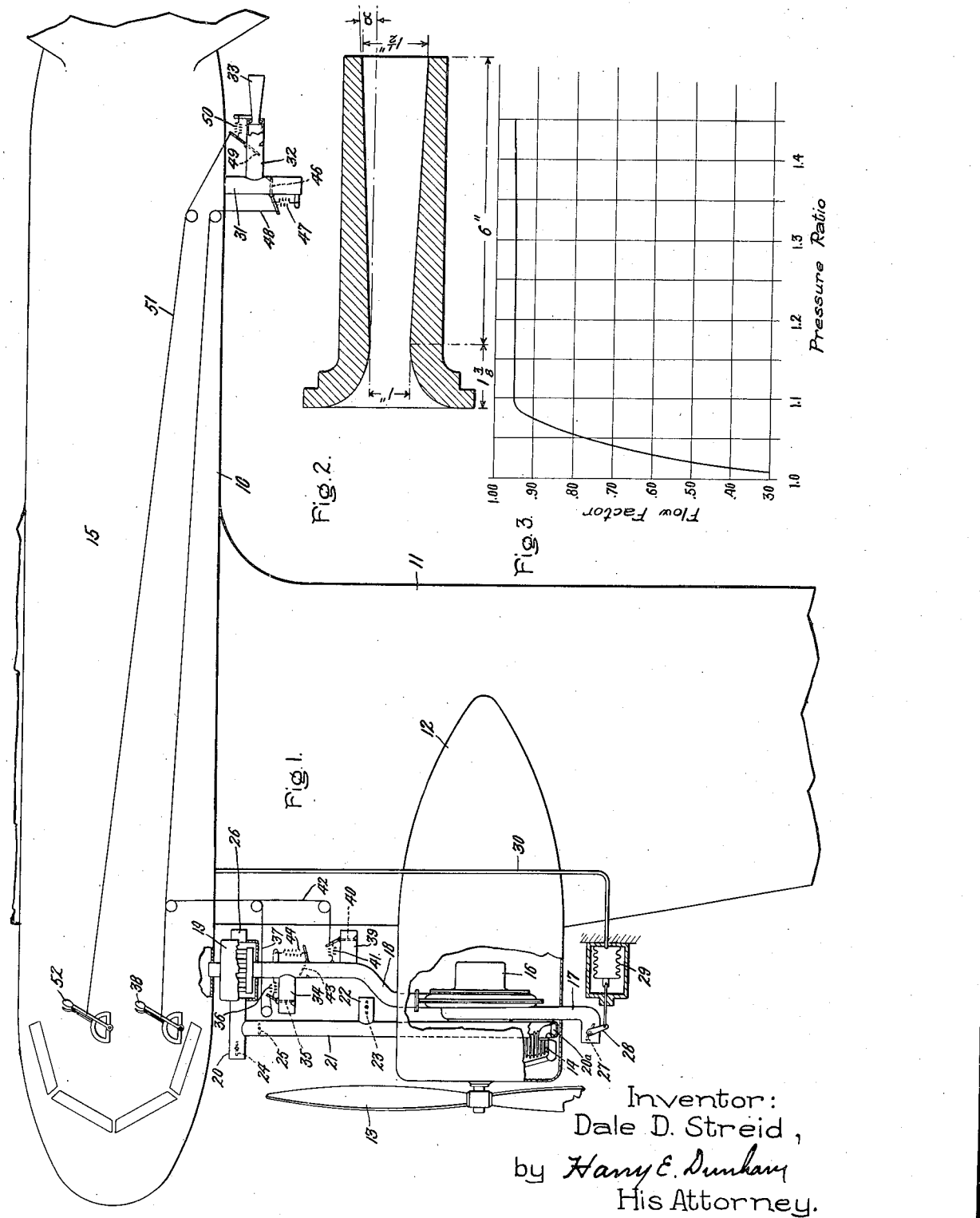
Inventor:
Dale D. Streid,
by Harry E. Dunham
His Attorney.

Patented Sept. 26, 1944

2,358,835

UNITED STATES PATENT OFFICE 2,358,835

PRESSURE CABIN CONTROL ARRANGEMENT

Dale D. Streid, West Lynn, Mass., assignor to General Electric Company, a corporation of New York Application October 26, 1940, Serial No. 363,019

11 Claims. (Cl. 98—1.5)

The present invention relates to pressure cabin control arrangements and has special significance in connection with aircraft although it is not necessarily limited thereto. In passenger and operators' cabins of aircraft to be flown at high altitude it is often required to maintain the cabin pressure at or above a fixed minimum value; for example, with an aircraft flying at altitudes of 8,000 or higher the pressure in the cabin is to be maintained substantially constant at a pressure of 22.22 inch mercury absolute corresponding to the normal pressure at 8,000 feet altitude. In addition to maintaining a desired pressure, it is necessary to ventilate passenger and operators' cabins by supplying or circulating fresh air through the cabins at high altitudes.

The object of my invention is to provide an improved pressure cabin control arrangement whereby the cabin pressure may be maintained substantially constant at or above a predetermined minimum value and fresh air is circulated through the cabin at a predetermined rate. This is accomplished in accordance with my invention by the provision of means for supplying air under pressure to the cabin and maintaining the pressure in the cabin substantially constant and the provision of other means for discharging air from the cabin at a predetermined rate substantially independent of changes in atmospheric pressure. The first means broadly includes a compressor with an inlet for receiving air from the atmosphere and an outlet connected to the cabin together with means for controlling the flow of air through the compressor in response to pressure changes in the discharge of the compressor. The means for discharging or exhausting air from the cabin in accordance with my invention broadly comprises a converging-diverging nozzle of the Venturi type connected to receive air from the cabin and discharge it into the atmosphere.

For a more complete understanding of what I believe to be novel and my invention, attention is directed to the following description and the claims appended thereto in connection with the accompanying drawing.

In the drawing, Fig. 1 illustrates an aircraft embodying my invention; Fig. 2 shows an enlarged sectional view of a part of Fig. 1, and Fig. 3 is an explanatory view.

The aircraft arrangement shown in the drawing comprises a fuselage 10 with wings 11 and a nacelle 12. The aircraft is propelled by a propeller 13 driven from an internal combustion engine 14 mounted in the nacelle 12. The fuselage 10 forms a cabin or cabins 15 for passengers and operators. Air under pressure is supplied to the cabin 15 during operation at high altitude by means of a compressor, such as a centrifugal type compressor or cabin supercharger, 16, in the present instance driven from the crank shaft of the engine 14. The compressor 16 has an inlet conduit 17 for receiving air from the atmosphere and a discharge conduit 18 for conducting air to the cabin. A surface type heat exchanger 19 is connected between the discharge conduit 18 and the cabin 15 to control the temperature of the air conducted to the cabin. To this end the heat exchanger 19 is connected to a conduit 20 for receiving cooling air from the atmosphere and to a conduit 21 for receiving a heating medium, in the present instance exhaust gases from an exhaust manifold 20a of the engine 14. The conduit 21 has a branch conduit 22 with a control valve 23 for bypassing gases directly into the atmosphere. Control valves 24 and 25 are also provided in the conduits 20 and 21 respectively. Heating and cooling medium supplied to the heat exchanger 19 is discharged therefrom through an exhaust conduit 26. With the valves 23, 24 and 25 positioned as shown in the drawing all of the exhaust gases are discharged from the conduit 21 through the bypass 22 into atmosphere and cooling air is conducted through the conduit 20 to the heat exchanger thereby cooling the air to the pressure cabin. When heating of this air is desired, valves 24 and 23 are moved towards closing position and valve 25 is moved towards opening position to reduce the amount of cooling air through the conduit 20 and simultaneously to increase the amount of heating medium conducted through the conduit 21 to the heat exchanger 19.

Means are provided for controlling the operation of the compressor 16 in response to pressure changes in the cabin 15. In the present example this means is in the form of a butterfly valve 27 in the inlet conduit 16 to the compressor. The valve 27 has an arm 28 connected to a suitable pressure-responsive device, indicated as a bellows 29 connected by a pipe 30 to a point beyond the heat exchanger 19 as regards the direction of the flow of air to the cabin 15. In the present instance pipe 30 is directly connected to the cabin 15. With the arrangement as described an increase in pressure in the cabin 15 causes the bellows 29 to expand and thereby to move the inlet valve 27 towards closing position to reduce the flow of air to the supercharger and consequently to effect a drop in pressure in the cabin 15. In this manner the pressure in the cabin 15 is maintained substantially constant, neglecting minor changes which may be caused due to the regulation of the valve 27. Suitable means are provided to preclude changes of atmospheric or altitude pressure from affecting the operation of the bellows 29. In the present example the latter is enclosed in known manner in a sealed casing. In other instances the bellows may be located within the cabin.

In order to effect circulation of air through the cabin, conduit means are provided for exhausting air from the cabin into the atmosphere. This conduit means comprises conduits 31, 32 connected to the cabin 15, and a converging diverging Venturi type nozzle 33 connected to the outlet end of the conduit 32. The nozzle 33 as shown more in detail in Fig. 2, is circular in section with an outlet diameter about 1.5 times the throat diameter and a distance between the throat and the outlet about 6 times the throat diameter, whereas the distance between the inlet and the throat is about 1⅜ times the throat diameter. The diverging angle in the present instance is about 2½°. In general, this angle should be more than 1° and less than 20° and the outlet diameter should be more than 1.1 times and less than 2.5 times the throat diameter of the nozzle. A nozzle of this type has the important characteristic of maintaining constant flow as long as the pressure at its inlet, that is, the cabin pressure, is substantially constant and the pressure at its outlet is less than about 91% of the cabin pressure. This characteristic is shown more clearly in the diagram of Fig. 3 in which the curve represents the values of the flow factor for different ratios of inlet and outlet pressures, that is, cabin and atmospheric or back pressures. This curve is based on test data. The flow factor represents the ratio of the actual weight flow to the theoretical flow if the exhaust pressure were zero. For pressure ratios of 1.1 and above, the flow factor is constant, about 95% as illustrated by Fig. 3. This means with regard to the aircraft cabin, a constant flow of air will be discharged through the nozzle 33 as long as the pressure in the cabin is maintained constant and the atmospheric pressure external the cabin is less than 91% of the cabin pressure. Thus, if a pressure corresponding to the pressure existing at 8,000 feet altitude is to be maintained in the cabin, the flow through the nozzle 33 will be constant at all plane flight altitudes above 10,000 feet. Between 10,000 and 8,000 feet the flow will be reduced. At 8,000 feet the flow will be zero and at 9,000 feet the flow will be reduced by about 25% due to the relatively high back pressure.

In certain instances, such as at low altitude plane operation or upon failure of the compressor, it may be desirable to disconnect the compressor from the cabin and to supply ventilating air directly from the atmosphere. Furthermore, the cabin usually has some leakage and this leakage increases with increasing altitude at constant cabin pressure. This leakage makes it desirable to reduce the normal flow of air through the discharge nozzle 33. Finally, it is desirable to provide a relief valve for discharging air from the cabin when the ratio between the pressures inside and outside the cabin rises beyond a fixed value which may be unsafe for the cabin structure to withstand without bursting.

In order to meet the aforementioned requirements the discharge conduit 18 of the compressor 16 is provided with an inlet branch or conduit 34 for receiving air directly from the atmosphere. A control valve 35 located in the conduit 34 is biased towards closing position by a spring 36 and connected by a cable 37 to a control lever 38, in such a manner that the cable works to open the valve and the spring 36 and the pressure in the cabin normally work to close the valve. In addition, the conduit 18 is connected to an exhaust or bypass conduit 39 provided ahead of the inlet conduit 34 as regards the direction of flow of fluid from the compressor through the conduit 18. The discharge of air from the compressor through the conduit 39 to atmosphere is controlled by a valve 40 biased towards closing position by a spring 41 and connected by a cable 42 to the aforementioned control lever 38 in such a manner that the cable works to open the valve and the spring 41 and the pressure inside conduit 39 work to close the valve. Another control valve 43 is provided in the conduit 18 between the conduits 34 and 39. The valve 43 is biased towards closing position by a spring 44 so that upon failure of the compressor the spring 44 and the cabin pressure will hold valve 43 closed, thereby sealing the cabin.

The relief valve 46 is provided in the conduit 31 at a point beyond the connection of the conduit 31 with the conduit 32 as regards the flow of fluid therethrough. The valve 46 is biased towards the closed position by a spring 47 and connected by a cable 48 to the control lever 38 in such a manner that the cable 48 works to open the valve against the biasing force of the spring 47. Also, the valve will open if the cabin pressure exceeds the outside atmospheric pressure by a predetermined amount. Finally, a control valve 49 is provided in the conduit 32 ahead of the inlet of the nozzle 33. The valve 49 is biased towards opening position by a spring 50 and connected by a cable 51 to another control lever 52.

During normal operating condition the control levers 38 and 52 are moved to the right, thereby relaxing the various control cables and causing closing of the valve 35 by the action of the spring 36 and by action of the pressure in conduit 18, closing of the valve 40 by the action of the spring 41 and by action of the pressure in the conduit 18. Valve 43 is normally maintained open against the biasing force of the spring 44 by the action of the fluid flow through the conduit 18. Loosening of the cable 48 causes closing of the valve 46 by action of the spring 47, and loosening of the cable 51 causes opening of the valve 49 by the action of the spring 50. With the valves in the position just described the arrangement operates in the manner set forth above. Air under pressure is continuously supplied to the cabin 15 by the compressor 16 through the conduit 18 and the heat exchanger 19, the pressure in the cabin being maintained constant by control of the inlet valve 27 through the pressure-responsive device 29, 30. If the control is set to maintain the pressure in the cabin at about 22.22 inch mercury absolute, corresponding to the pressure at an altitude of 8,000 feet, constant circulation, that is, a substantially constant flow of air through the discharge nozzle 33 is maintained at all altitudes above 10,000 feet. In other words, the discharge of air is maintained constant at all back pressures corresponding to 10,000 feet altitude or higher.

If leakage from the cabin occurs, the normal discharge of air through the nozzle 33 may be reduced by moving the valve 49 towards closing position, thereby compensating for the leakage. This is effected by moving the control lever 52 to the left.

At low altitudes, when supercharging of the cabin is not needed, the control lever 38 is moved to the left, thereby opening the valves 35, 40 and 46. With the valves in this position, air flowing through the supercharger is discharged from the conduit 18 to atmosphere through the conduit 39, and air is conducted from the atmosphere through the conduit 34 and the heat exchanger 19, to the cabin and discharged therefrom to atmosphere through the conduit 31 and the open valve 46, as well as through the conduit 32 and the nozzle 33. Thus, both the compressor and the cabin at low altitudes receive air directly from atmosphere and discharge air directly to atmosphere. During such condition, the inlet valve 27 of the compressor is moved towards closing position by the pressure in the cabin, thereby reducing the energy for driving the compressor. Also, the compressor may be disconnected in known manner from the engine when not needed, for example, by the provision of a suitable clutch or coupling, not shown. In some installations the conduits 34 and 39 and the valves 35 and 40 may be omitted and under these conditions the compressor 16 may supply air to the cabin under atmospheric pressure for ventilation. Upon failure of the compressor, the control lever 52 is moved to the left, thereby closing the valve 49 and preventing discharge of air through nozzle 33. The valve 43 will also close by action of spring 44 and the pressure in the cabin, thereby sealing the cabin against loss of air.

The valve 46 which is closed during supercharging of the cabin also may act as a relief valve automatically to open to discharge air from the cabin directly to atmosphere as the ratio of the cabin pressure and the atmospheric pressure, exceeds a safe value. If this occurs, the valve 46 remains open until the pressure ratio has dropped below a predetermined safe value. The valve 46 then closes automatically by action of the spring 47.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Pressure cabin control arrangement comprising a cabin, means including a source of air under pressure connected to the cabin, means for controlling the flow of air from the source to the cabin in response to pressure changes therein to maintain the pressure in the cabin substantially constant during operation below a predetermined external pressure, and means consisting of a venturi having a constantly open and unobstructed throat connected to the cabin for normally discharging air from the cabin at a substantially constant rate when the pressure within the cabin is maintained constant and the external pressure varies below a critical limiting percentage of about 90% of the pressure maintained constant in the cabin.

2. Pressure cabin control arrangement comprising a cabin, means for conducting air under pressure to the cabin to maintain constant pressure therein during operation, and means consisting of a converging-diverging nozzle having a constantly open and unobstructed throat connected to the cabin for continuously discharging air from the cabin at a predetermined constant rate substantially independent of the pressure external to the cabin when the pressure within the cabin is maintained constant and the external pressure varies below a critical limiting percentage of the order of 90% of the pressure maintained constant in the cabinet.

3. Pressure cabin control arrangement for aircraft comprising an aircraft cabin, a compressor connected to the cabin to supply air under pressure thereto during operation above a certain altitude, means for controlling the compressor in response to pressure changes in the cabin to maintain the cabin pressure substantially constant, and means consisting of a converging-diverging nozzle having a constantly open and unobstructed throat connected to the cabin for discharging air from the cabin at a predetermined constant rate when the pressure within the cabin is maintained constant and the external pressure varies below a critical limiting percentage of about 90% of the pressure maintained constant in the cabin.

4. Pressure cabin control arrangement for aircraft comprising an aircraft cabin, a compressor connected to the cabin to supply air under pressure thereto, means for controlling the compressor in response to pressure changes in the cabin to maintain the cabin pressure substantially constant, and means consisting of a converging-diverging nozzle having a constantly open and unobstructed throat connected to the cabin normally to discharge air from the cabin at a rate substantially constant for constant cabin pressure and for all atmospheric pressures less than 91% of the cabin pressure.

5. Pressure cabin control arrangement for aircraft comprising a cabin, means for conducting air to the cabin to establish a substantially constant pressure therein above that of the atmospheric pressure during operation above a certain altitude, means for controlling the last named means in response to pressure changes in the cabin, and means consisting of a converging-diverging nozzle having a constantly open and unobstructed throat connected to the cabin for normally discharging air therefrom, said nozzle having an outlet diameter more than 1.1 and less than 2.5 times its throat diameter and a diverging angle between 1 and 20 degrees to render the discharge of air from the cabin independent of variations of back pressures less than 91% of the cabin pressure as long as the latter remains constant.

6. Cabin pressure control arrangement for aircraft comprising a cabin, a compressor connected to receive air from the atmosphere and to conduct air to the cabin, a heat exchanger connected between the discharge of the compressor and the cabin, means including a pressure-responsive device connected to the cabin for controlling the compressor to maintain substantially constant pressure in the cabin, means consisting of a converging-diverging nozzle having a constantly open and unobstructed throat connected to the cabin for discharging air from the cabin at a rate substantially independent of the atmospheric pressure when the latter is less than 91% of the cabin pressure and the cabin pressure is maintained constant, and means including a valve arranged ahead of the nozzle as regards the direction of flow to reduce the flow therethrough upon leakage of air from the cabin.

7. Cabin pressure control arrangement for aircraft comprising a cabin, a compressor having an inlet communicating with the atmosphere, a conduit connecting the outlet of the compressor to the cabin, means for controlling the compressor in response to pressure changes in the cabin to maintain the pressure therein substantially constant, means including a valve in the conduit and a bypass with a valve connected to the conduit to disconnect the compressor from the cabin and to discharge air therefrom directly to the atmosphere, and means consisting of a converging-diverging type nozzle having a constantly open and unobstructed throat to discharge air from the cabin at a rate substantially independent of the atmospheric pressure when the latter is less than 91% of the cabin pressure and the cabin pressure is maintained constant.

8. In an aircraft cabin supercharger arrangement, the combination of a cabin, a source of air under pressure connected to the cabin, means for controlling the supply of air from the source to the cabin to maintain constant pressure in the cabin, means consisting of a venturi having a constantly open and unobstructed throat connected to the cabin for normally discharging air from the cabin at a predetermined constant rate when the pressure within the cabin is maintained constant and the external pressure is at least about 10% below the cabin pressure, and means associated with the venturi for rendering the latter inoperative upon excess leakage of air from the cabin.

9. In an aircraft cabin supercharger arrangement, the combination of a cabin, a source of air under pressure connected to the cabin, means for controlling the supply of air from the source to the cabin to maintain constant pressure in the cabin, means consisting of a venturi having a constantly open and unobstructed throat connected to the cabin for normally discharging air from the cabin at a predetermined constant rate when the pressure within the cabin is maintained constant and the external pressure is about 10% below the cabin pressure, and additional means for discharging air from the cabin upon the pressure drop across the cabin walls exceeding a certain value.

10. In an aircraft cabin supercharger arrangement, the combination of a cabin, a source of air under pressure connected to the cabin, means for controlling the supply of air from the source to the cabin to maintain constant pressure in the cabin, and a venturi having a constantly open and unobstructed throat connected to the cabin, said throat being dimensioned to discharge air from the cabin at a predetermined constant rate during operation at altitudes above 10,000 feet when the pressure within the cabin is maintained constant at a value equal to the atmospheric pressure at about 8,000 feet.

11. In an aircraft cabin supercharger arrangement, the combination of a cabin, a source of air under pressure connected to the cabin, means for controlling the supply of air from the source to the cabin to maintain constant pressure in the cabin, and a discharge passage having a portion consisting of a venturi with a constantly open and unobstructed throat for connecting the cabin to atmosphere, said throat normally constituting the greatest restriction to flow of air through said passage and said venturi being designed for a critical back pressure of less than about 90% of the cabin pressure.

DALE D. STREID.